UNITED STATES PATENT OFFICE.

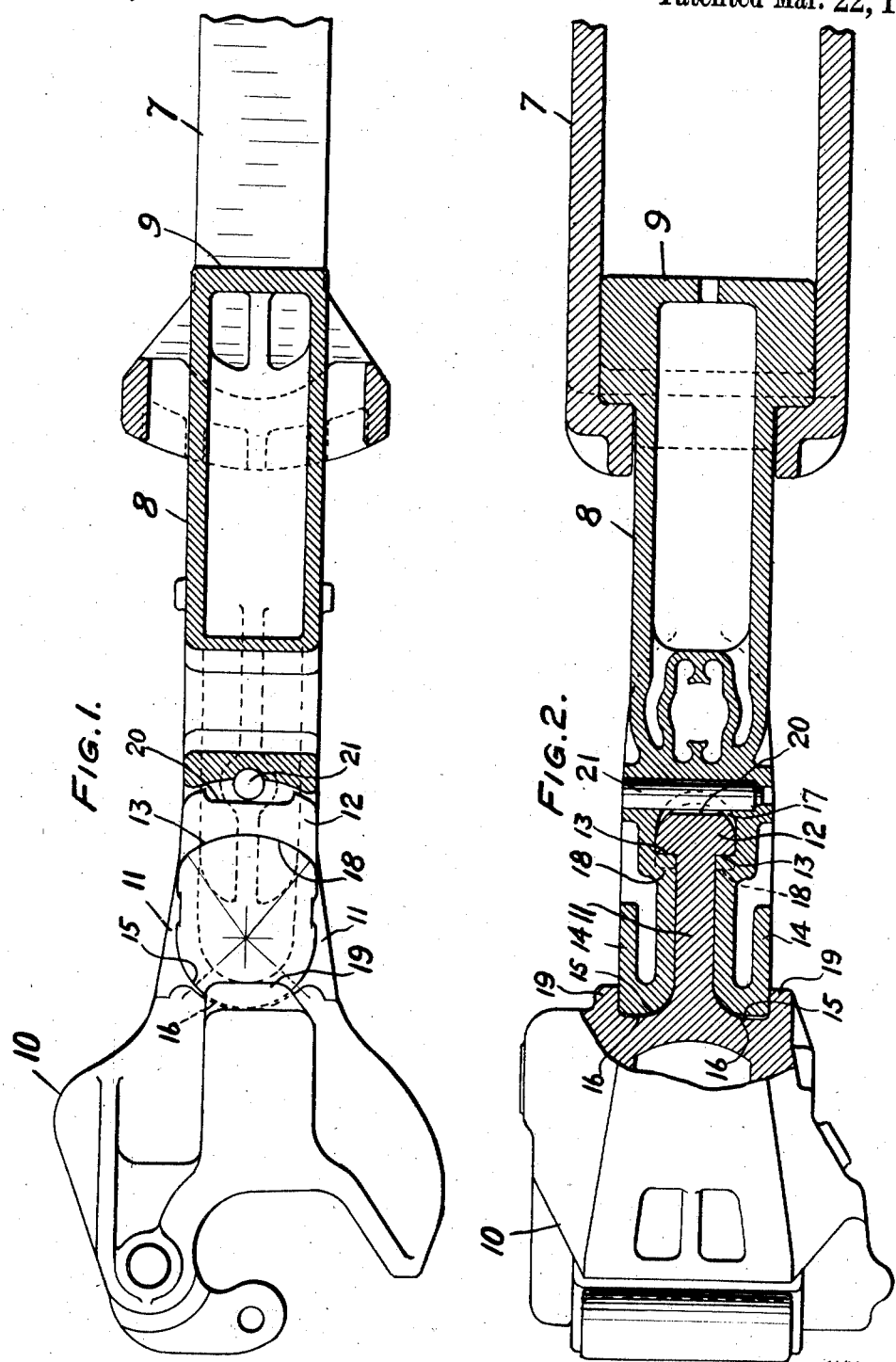

CHARLES D. YOUNG, OF WILMINGTON, DELAWARE.

COUPLING.

1,372,214.  Specification of Letters Patent.  Patented Mar. 22, 1921.

Application filed August 27, 1917. Serial No. 188,357.

*To all whom it may concern:*

Be it known that I, CHARLES D. YOUNG, a citizen of the United States, residing at Wilmington, county of New Castle and State of Delaware, have invented certain new and useful Improvements in Couplings, of which the following is a specification.

This invention relates to railway car couplers and is especially designed for use on very long cars. It has for its objects the provision of a coupler head which has radial movement with respect to the shank without the use of a pivoting pin; the provision of a large bearing surface to receive the pull or tension; and the provision of a large abutting surface for compression or buffing, and so disposed as to prevent spreading of the engaging surface. Some difficulty has been found in maintaining coupling on long cars while rounding curves and it is the primary object of this invention to provide a construction of the character specified which overcomes this difficulty. The invention is illustrated in preferred form in the accompanying drawings, wherein—

Figure 1 is a plan view, partly in section, of a car coupler embodying my invention and Fig. 2 is a partial vertical section of the same.

Referring to the drawings, the yoke 7 is at one end of the shank 8, and embraces a bearing head 9. The coupler head 10 is provided with a tail 11 having at its end an enlarged portion 12, said enlarged portion providing two curved bearing surfaces 13 which receive the pulling strains as will further appear. The shank 8 is constructed, at its forward end, with an upper and a lower projection or fork end 14, cored out as shown, each projection having a curved end 15 adapted to abut against correspondingly curved surfaces 16 on the coupler head, which surfaces receive the compression or buffing strains. Shoulders 19 on the coupler head extend rearwardly to form a socket into which the ends of the members 14 project. The tail 11 of the coupler head fits between the projections 14 on the shank, the enlarged end 12 fitting into a correspondingly enlarged recess 17, the offset portions 18 at the forward end of the recess 17 being curved, as shown, to engage the curved bearing surfaces 13 previously mentioned. The curved bearings between the surfaces 13 and 18 and between the surfaces 15 and 16 permit radial movement of the head without the use of a pin. Spreading of the surfaces 15 under buffing strains is avoided because the members 14 project into recesses formed between the tail 11 and the shoulders 19. In order to limit the movement of the coupler head the enlarged end 12 is provided with the groove 20, the sides of which are adapted to engage a stop pin 21.

The head and shank are assembled and disassembled by removing the stop pin and turning the head 90° from the position in which it is shown which will throw the enlarged end 12 out to one side after which the head may be readily withdrawn.

It will thus be seen that the great freedom of movement necessary in a coupling when rounding a curve is provided by my swinging head without the use of a pivoting pin.

The device is simple in construction and strong, with both large buffing surface and large pulling surface.

I claim:—

1. The combination in a coupler device of a shank having a forked end the recess between the prongs being enlarged at the base, and a head having a tail adapted to be entered between the prongs and provided with a shoulder adapted to be entered in the enlarged portion of the recess, the end of the shank and the adjacent portions of the head being respectively convexly and concavely formed, the surfaces being struck on a center located on the shank side thereof, and the shoulder and enlargement of the recess being respectively concavely and convexly formed, the surfaces being struck from the same center but with a greater radius.

2. The combination in a coupler device of a shank having a forked end the recess between the prongs being enlarged at the base, and a head having a tail adapted to be entered between the prongs and provided with a shoulder adapted to be entered in the enlarged portion of the recess, the end of the shank and the adjacent portions of the head being respectively convexly and concavely formed, the surfaces being struck on a center located on the shank side thereof, and the shoulder and enlargement of the recess being respectively concavely and convexly formed, the surfaces being struck from the same center but with a greater radius, the parts being assembled and disassembled by inserting the tail of the head between the prongs substantially transversely of the shank and then relatively rotating the same.

3. The combination in a coupler device of a shank having a forked end the recess between the prongs being enlarged at the base, and a head having a tail adapted to be entered between the prongs and provided with a shoulder adapted to be entered in the enlarged portion of the recess, the end of the shank and the adjacent portions of the head being respectively convexly and concavely formed, the surfaces being struck on a center located on the shank side thereof, and the shoulder and enlargement of the recess being respectively concavely and convexly formed, the surfaces being struck from the same center but with a greater radius, the parts being assembled and disassembled by inserting the tail of the head between the prongs substantially transversely of the shank and then relatively rotating the same together with means adapted to prevent unlocking movement.

In testimony whereof, I have hereunto signed my name.

CHARLES D. YOUNG.